US009806367B2

(12) United States Patent
Lin et al.

(10) Patent No.: US 9,806,367 B2
(45) Date of Patent: Oct. 31, 2017

(54) FABRICATION PROCESS FOR PRODUCTION OF SOFC-MEA WITH A PORE ARRAY ANODE STRUCTURE FOR IMPROVING OUTPUT POWER DENSITY

(71) Applicant: INSTITUTE OF NUCLEAR ENERGY RESEARCH, Taoyuan County (TW)

(72) Inventors: Tai-Nan Lin, Taoyuan County (TW); Jen-Yuan Kuo, Taoyuan County (TW); Hong-Yi Kuo, Taoyuan County (TW); Wei-Xin Kao, Taoyuan County (TW); Chun-Yen Yeh, Taoyuan County (TW)

(73) Assignee: INSTITUTE OF NUCLEAR ENERGY RESEARCH, Taoyuan (TW)

( * ) Notice: Subject to any disclaimer, the term of this patent is extended or adjusted under 35 U.S.C. 154(b) by 173 days.

(21) Appl. No.: 14/645,104

(22) Filed: Mar. 11, 2015

(65) Prior Publication Data

US 2016/0268620 A1 Sep. 15, 2016

(51) Int. Cl.
   *H01M 8/10* (2016.01)
   *H01M 8/124* (2016.01)
   *H01M 8/1246* (2016.01)
   *H01M 8/1213* (2016.01)
   *H01M 4/88* (2006.01)

(52) U.S. Cl.
   CPC ......... *H01M 8/124* (2013.01); *H01M 4/8875* (2013.01); *H01M 8/1213* (2013.01); *H01M 8/1246* (2013.01); *H01M 2008/1293* (2013.01); *Y02E 60/525* (2013.01); *Y02P 70/56* (2015.11)

(58) Field of Classification Search
   CPC ... H01M 4/8875; H01M 8/1213; H01M 8/124
   See application file for complete search history.

(56) References Cited

U.S. PATENT DOCUMENTS

| | | | | |
|---|---|---|---|---|
| 2009/0068373 | A1* | 3/2009 | Lee ..................... | H01M 4/8885 427/453 |
| 2009/0166907 | A1* | 7/2009 | Wang ................. | H01M 4/8621 264/40.1 |
| 2014/0170532 | A1* | 6/2014 | Ohtani ............... | H01M 8/1213 429/534 |
| 2014/0272665 | A1* | 9/2014 | Yoon ........................ | B32B 5/16 429/482 |

* cited by examiner

*Primary Examiner* — Jonathan Jelsma
(74) *Attorney, Agent, or Firm* — Pai Patent & Trademark Law Firm; Chao-Chang David Pai

(57) ABSTRACT

A fabrication process for production of planar type solid oxide fuel cell with high electrical conductivity and low fuel gas impedance is disclosed. It is a tape casting to produce an anode substrate furnished with a pore array structure on one or plurality of layers of the anode green tape on the utmost outside of the anode. It is to implement the process of solid oxide fuel cell membrane electrode assembly (SOFC-MEA) with precision abrasion to remove nickel depleted layer on the anode surface to complete the production of a unit cell. The fabrication of anode with pore array structure provides a good conduction effect for fuel gas and the solid oxide fuel cell with this treatment has features of high electrical conductivity and low fuel gas impedance to improve the performance of SOFC unit cell.

5 Claims, 7 Drawing Sheets

FABRICATION PROCESS FOR PRODUCTION OF SOFC-MEA WITH A PORE ARRAY ANODE STRUCTURE FOR IMPROVING OUTPUT POWER DENSITY

BACKGROUND OF THE INVENTION

1. Field of the Invention

The invention relates to a fabrication process for production of a planar solid oxide fuel cell with high conductivity by reducing impedance of a solid oxide fuel cell (SOFC) membrane electrolyte assembly (MEA), in particular, to a pore array structure furnished on one or plurality of layers of anode green tapes on the utmost outside of the anode.

2. Description of the Prior Art

The operation temperature for traditional YSZ electrolyte supported cell (ESC) is in the range from 800° C. to 1000° C. Its electrolyte substrate thickness is about 150 μm to 300 μm. ESC type cell normally operates at high temperature mainly due to thick electrolyte substrate. Thus, the mainstream product is (NiO+YSZ) anode supported cell (ASC), which has electrolyte layer with YSZ as primary material and thickness is around 10 μm, and it can lower the operation temperature in the range from 650° C. to 800° C. A common ASC membrane electrolyte assembly (MEA) process is first to synthesize anode, and then conduct sintering for electrolyte and cathode. It usually takes at least three high-temperature sintering processes at about 1400° C. The multiple-stage sintering process usually will cause compositional change or deformation, so it increases cell impedance. This technology research is mainly focused on further improving the traditional MEA research program, with the anode pore array structure, can effectively reduce the gas diffusion impedance, increase output power density of batteries and provide sustainable power output. After resolving the adverse impact caused by the electrodes sintering, the SOFC power generation will be greatly enhanced.

The traditional YSZ electrolyte supported cell (ESC) is operated with temperature range between 800° C. to 1000° C. The electrolyte substrate thickness is about from 150 μm to 300 μm. Mainly due to thick electrolyte substrate, ESC type cell operates at high temperature. The mainstream product is (NiO+YSZ) anode supported cell (ASC), which has electrolyte layer (YSZ as primary material) and thickness is around 10 μm, and it can lower the operation temperature to a range from 650° C. to 800° C. A common ASC membrane electrolyte assembly (MEA) process is first to synthesize anode, and then conduct sintering for electrolyte and cathode. It usually takes at least three high-temperature sintering processes at about 1400° C. The multiple-stage sintering process would usually cause compositional change or deformation, so it increases cell impedance. The novel development for this technology is primarily to maintain the traditional manufacturing process and use a novel treatment process that can effectively solve the negative issues with multiple-stage sintering. This novel process can effectively reduce impedance, increase ion conductivity and increase SOFC power generation.

Conventional anode supported SOFC-MEA fabrication process is to use tape casting to produce electrode green tapes, adjust the thickness and the geometry of green tape substrate through lamination, produce a half-cell containing electrolyte layer and electrode supporting substrate through calcinations/sintering, and finally use screen printing technique to build cathode layer onto the half cell substrate to complete the production of the full cell. The main disadvantages of the conventional fabrication process are stability and durability, namely, reduction-oxidation cycling and/or thermal cycling, are poor.

In order to facilitate the mechanism of gas-solid phase reaction, the cathode and anode electrodes need to be produced with porosity as a basic requirement, and that will compromise the mechanical strength of the electrodes, causing subsequent cell stack assembly package subject to break and fail. The drawbacks abovementioned hinder the development of SOFC to a perfect structure. An innovative solution is in need to solve the problem.

In view of the drawbacks of the conventional art, the present invention provides an improvement to the fabrication process for the solid oxide fuel cell (SOFC) membrane electrode assembly (MEA), using tape casting to produce anode substrates. This thin strip of green tape anode is subject to a special treatment of pore array perforation, forming an anode supporting substrate by sintering, followed by screen printing/sputtering/spin coating/spray film coating fabrication process to successfully produce high quality SOFC cell with low fuel gas diffusion impedance, improving electrical conductivity of the anode side, and finally removing the insulating layer of depleted nickel layer formed on the surface of the anode through precision abrasion. It can effectively enhance the performance of SOFC unit cell.

This application is related to U.S. patent application Ser. No. 11/964,724 filed on Dec. 27, 2007 (issued as U.S. Pat. No. 7,815,843 on Oct. 19, 2010) and entitled "Process for anode treatment of SOFC-MEA to upgrade power density in performance test", which is hereby incorporated by reference for its entirety.

SUMMARY OF THE INVENTION

The main object of the present invention is to provide a solid oxide fuel cell (SOFC) membrane electrode assembly (MEA) by using tape casting to produce thin strip of green tape anode substrate, in particular, the thin strip of green tape anode is subject to a special treatment of pore array perforation, forming an anode supporting substrate through sintering, followed by screen printing/sputtering/spin coating/spray film coating to produce an unit cell with low diffusion impedance in the fuel gas electricity generation operation, and lastly removing a nickel depleted layer on the surface of the anode with precise abrasion to improve performance of the SOFC unit cell.

Another object of the present invention is to provide an innovative pore array perforation on the anode electrode for the SOFC-MEA unit cell to improve electrical performance for the unit cell. The unit cell is subject to a special treatment of pore array perforation with a thin metal tube to press and pierce holes on the anode electrode without causing irregular form or fracture at the perimeter of holes being perforated, so that the unit cell having low diffusion impedance in fuel gas electricity generation operation that can improve the ability of three phase reaction at interfacial area among electrodes of the unit cell that can effectively enhance the output power density of the unit cell and provide power output with long term stability.

Another object of the present invention is to provide an innovative pore array perforation on the anode electrode for the SOFC-MEA unit cell to improve electrical performance for the unit cell, wherein the pore array perforation is furnished on one or plurality of layers of the anode green tape on the utmost outside of the anode. In an electrical performance test of the SOFC-MEA unit cell produced by the present invention, it shows that the electricity generation efficiency may raise a percentage of 25%, and the gas diffusion impedance can be lowered by a percentage of 40%.

The above and other objects, features and advantages of the present invention will become apparent from the following detailed description taken with the accompanying drawings.

DETAILED DESCRIPTION OF THE PREFERRED EMBODIMENT

The invention uses a novel process to produce high conductivity or low resistance planar solid oxide fuel cell. The procedures for the process are described as follows:

It is to use tape casting to produce a thin strip of green tape anode for a planar SOFC-MEA. Use diameter from 0.1 cm to 0.3 cm metal tube to fabricate a pore array structure on one side of the thin strip of green tape anode in a press and pierce manner, laminating multiple layers that include the perforated and non-perforated thin strips of the green tape anode through heat lamination and equalized water pressure lamination process, forming an anode substrate having thickness between 300 μm and 800 μm, conducting sintering between the temperature range from 1200° C. to 1500° C., preferably 1250° C., for several hours to produce the first stage SOFC of pre-sintered anode supported substrate. The material in this stage can be of NiO/YSZ, NiO/SDC, and NiO/LSGM.

It is to use ultrasonic equipment to clean up. After drying, use membrane electrolyte fabrication processes such as sputtering, spin coating and screen printing coating to produce electrolyte layer with thickness less than 10 μm. Conduct sintering at temperature range from 1200° C. to 1500° C. for several hours to complete the production of half cell. Use scanning electronic microscope (SEM) to analyze the microstructure of the half cell to assure the electrolyte layer is open pore free and fully dense, and has good interfacial adhesion between electrode and electrolyte.

Onto the electrolyte layer of the half cell, use screen printing technology to build porous cathode layer, of which the material is usually LSM or LSCF etc. Then conduct sintering for about 3 hours at temperature in the range from 900° C. to 1200° C. to complete the fabrication of SOFC-MEA. The complete unit cell is subject to anode surface polishing to remove nickel depleted layer about 10 μm to 30 μm in thickness. The main object of the SOFC-MEA unit cell of the present invention is to provide an innovative pore array perforation on the anode electrode for the SOFC-MEA unit cell to improve the electrical performance for the unit cell. The unit cell with special treatment of pore array perforation of the present invention will provide low diffusion impedance in the fuel gas generation operation, and improve the ability of three interfacial reactions among electrodes of the unit cell, which can effectively enhance the output power density of the unit cell and provide power output with long term stability.

Figure 1:
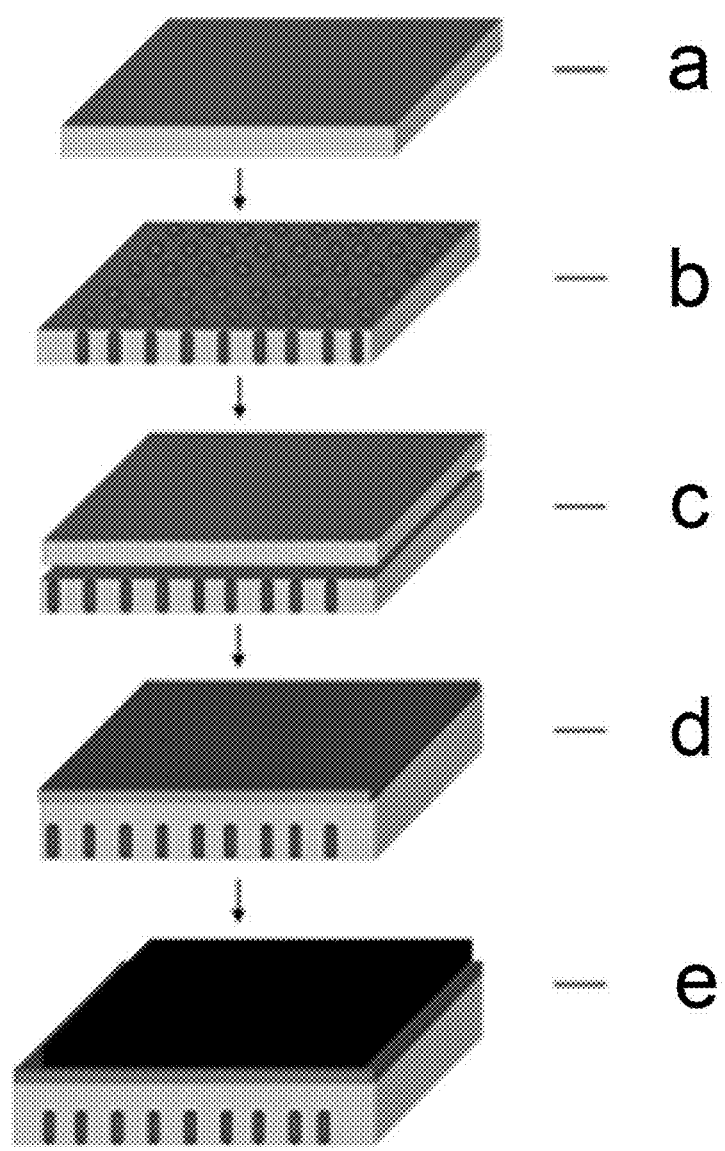
FIG. 1 is a block diagram illustrating a manufacturing process of the present invention, which comprises a) anode green tape fabrication, b) pore array anode structure, c) laminating layers of the anode green tape that include perforated and non-perforated anode green tape to form an anode supported substrate, d) electrolyte layer built on a abrasive and polished surface of the anode electrode, and e) fabrication of a cathode electrode.
Figure 2A:
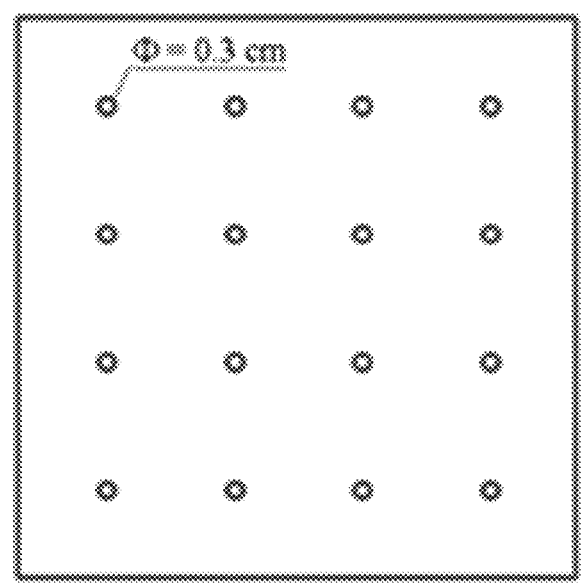
FIG. 2a is a schematic drawing illustrating a pore array anode structure of the present invention.
Figure 2B:
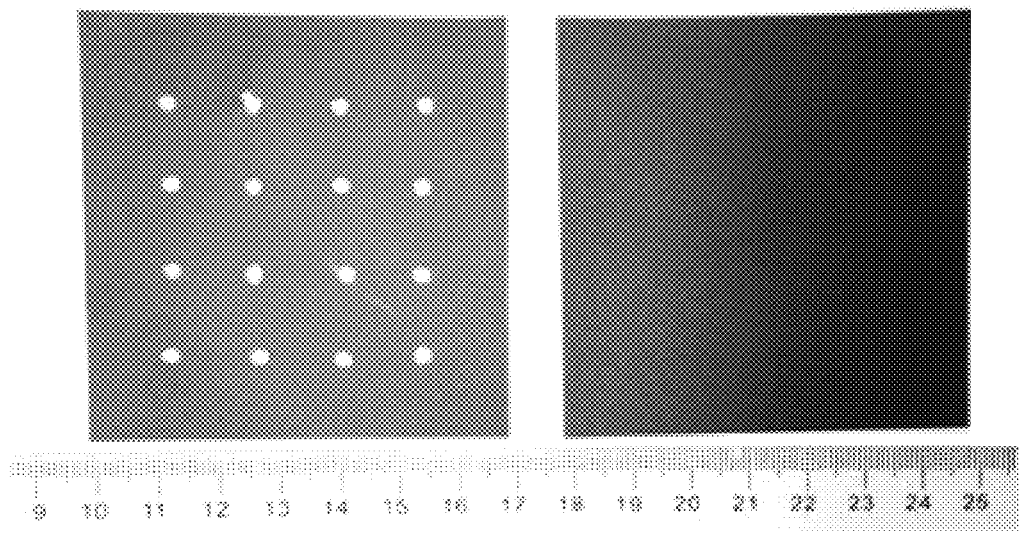
FIG. 2b is a front view of an anode supported SOFC with the pore array anode structure.
Figure 2C:
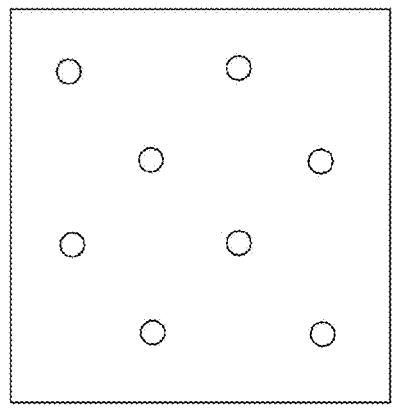
FIG. 2c and FIG. 2d are another embodiments showing interlaced pore array perforated on a plurality of thin strips of the anode green tape, respectively, of the present invention.
Figure 2C:
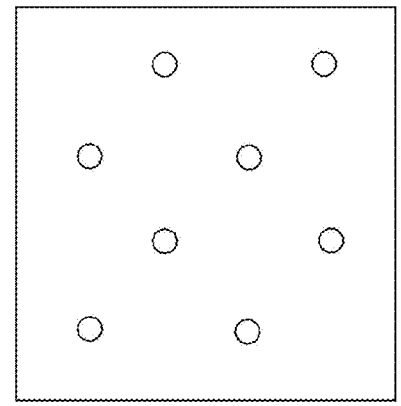
Figure 2D:
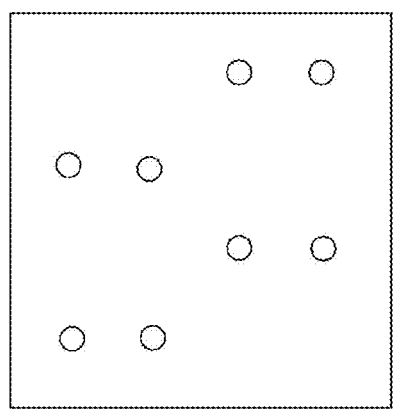
Figure 2D:
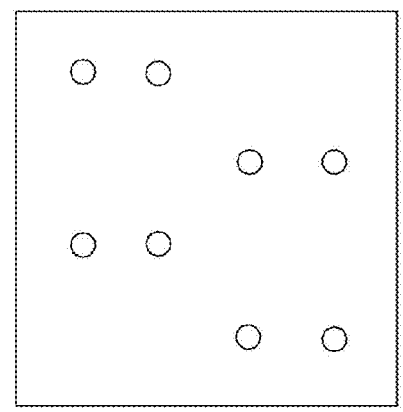

The invention uses a novel process to produce a planar solid oxide fuel cell high conductivity or low impedance with material 8YSZ, SDC, and LSGM. With reference to FIG. 2 through FIG. 6, the preferred embodiment for the process of the present invention comprises the steps of:

Step 1: Using tape casting to produce anode green tapes, and producing anode substrate for MEA with 50 wt % NiO+50 wt % 8YSZ and a certain amount of graphite;

Step 2: Fabricating a pore array structure on the surface of the tape casting made SOFC anode green tape, wherein the pore array perforation is furnished on one or plurality of layers of the anode green tape on the utmost outside of the anode, wherein the pore array furnished on the plurality of layers is distributed and interlaced on different anode green tapes, as shown in FIG. 2c and FIG. 2d, respectively. In order to avoid irregular pore and fracture caused by stress, the pore array is formed in a press and pierce manner using metal tube with diameter about 0.3 cm to fabricate the pore array perforation that has spacing of about 1.4 cm between each pore on one side of the thin strip of green tape anode, laminating multiple layers that include the perforated and non-perforated thin strips of the green tape anode through heat lamination and equalized water pressure lamination process, forming green tapes for anode supported substrate having thickness between 300 μm and 800 μm. The full size of the unit cell to be made is in the range from 5×5 cm² to 10×10 cm², but in considering a sintering shrinkage effect during the fabrication process, the size of anode green tape is made in the range from 7×7 cm² to 12×12 cm². A drawing illustrates the pore array structure is shown in FIG. 2.

Step 3: Conducting sintering the anode supported substrate green tape at temperature about 1250° C. for 4 hours with temperature increment/decrement rate less than, but not limited to, 3° C./min to obtain a first stage SOFC anode supported substrate, and conducting surface abrasion and polishing for the SOFC anode supported substrate, firstly, use coarse sand paper to perform surface pre-abrasion and polishing, and then change to finer sand paper. This step is to assure the flatness of the anode supported substrate.

Figure 3A:
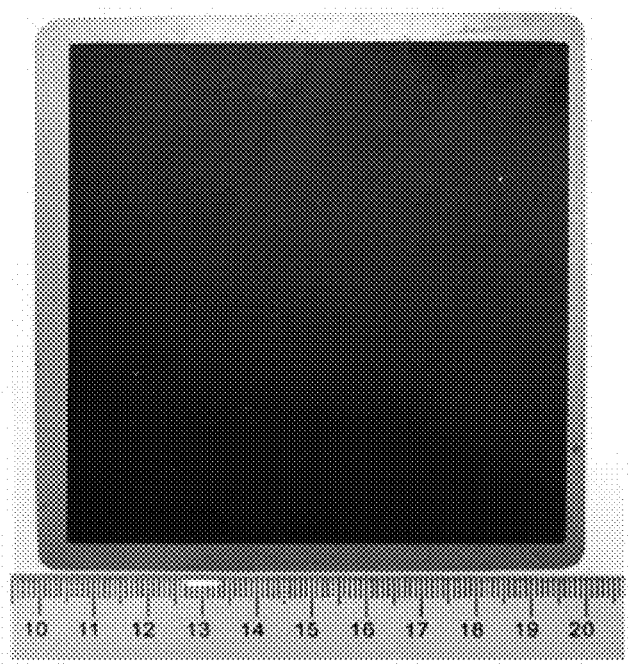
FIG. 3a is a front view of an anode supported SOFC of the present invention.
Figure 3B:
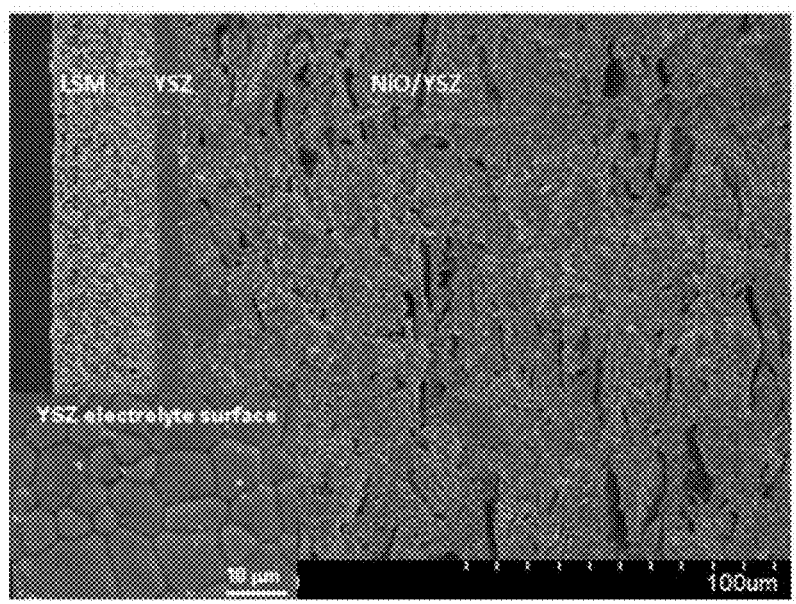
FIG. 3b is a picture indicating a micro structure view of the SOFC of the present invention.

Step 4: Using spin coating to build electrolyte with thickness less than 10 μm onto the polished electrode surface to produce SOFC half cell with green tape of electrolyte, conducting sintering between 1200° C. and 1600° C., preferably 1400° C., for more than 6 hours with temperature increment/decrement rate less than, but not limited to, 3° C./min to obtain the first stage ceramic half cell, followed by using SEM to analyze the microstructure of half cell and assure good adhesion between electrode and electrolyte, and that the electrolyte layer is open pore free, if open pores are still existing in the electrolyte layer, fixing the open pores with coating or sintering at temperature about 1400° C. for more than 6 hours to obtain a fully dense electrolyte, as shown in FIG. 3, having thickness of 10 μm. A unit cell with fully air tight structure of commercial size 10×10 cm$^2$ can be produced with the present invention.

Figure 4A:
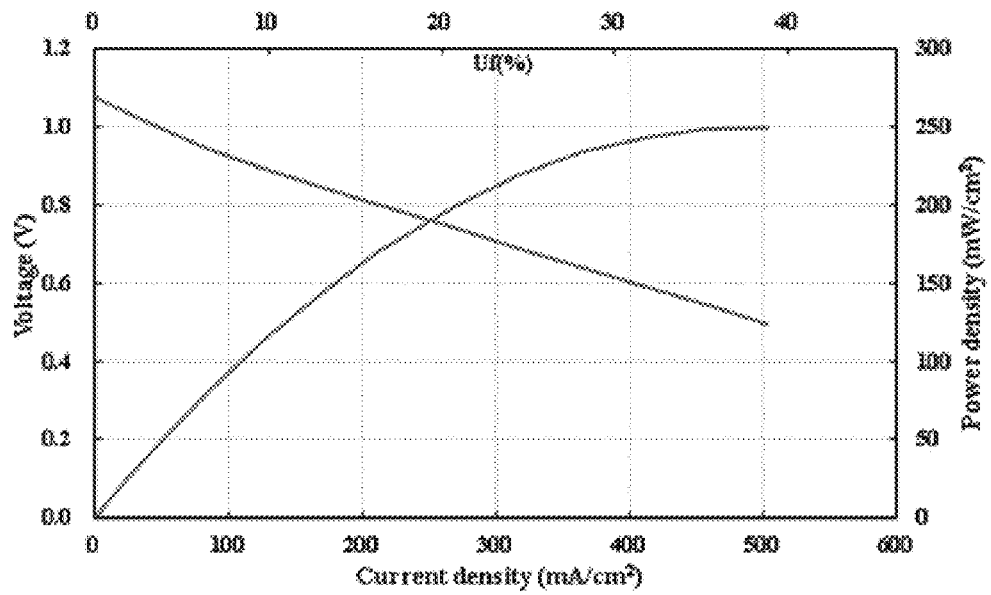
FIG. 4a is an electrical performance test result for a SOFC without perforation of a pore array anode structure.
Figure 4B:
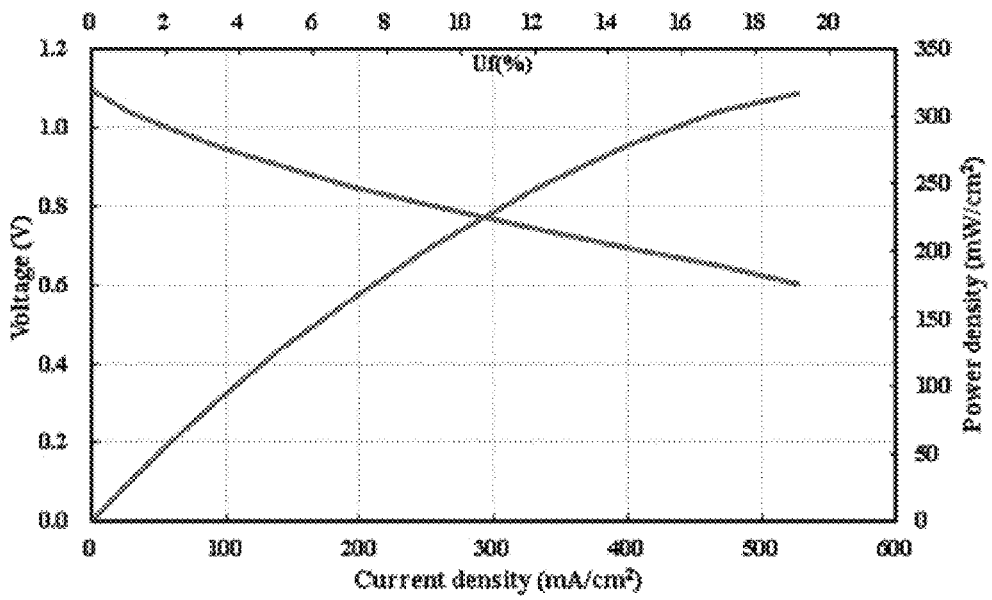
FIG. 4b indicates an electrical performance test result for a SOFC with perforation of a pore array anode structure.
Figure 5A:
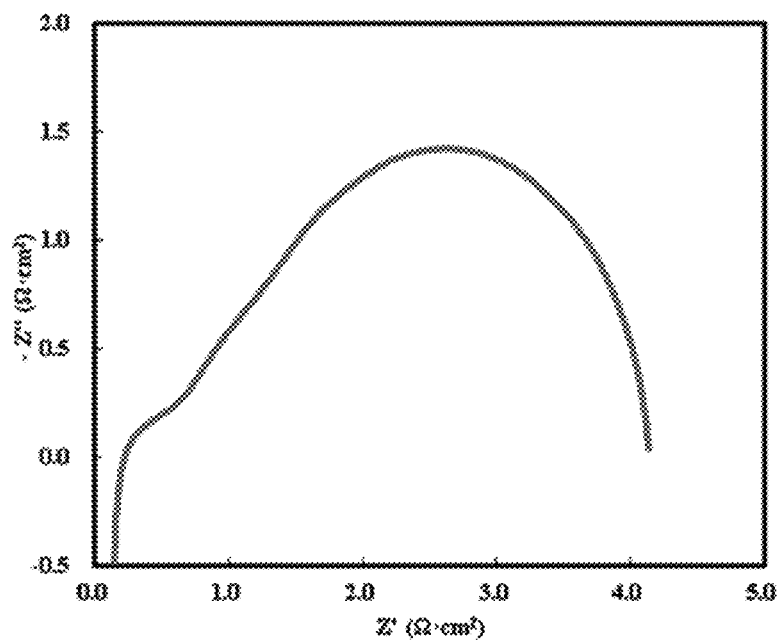
FIG. 5a is an impedance analysis result for a SOFC without perforation of a pore array anode structure.
Figure 5B:
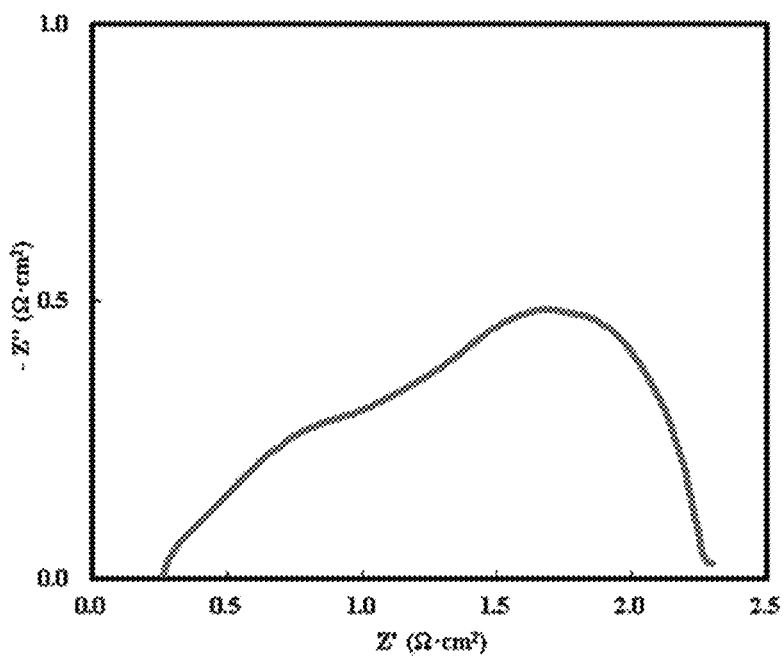
FIG. 5b indicates an impedance analysis result for a SOFC with perforation of a pore array anode structure.
Figure 6:
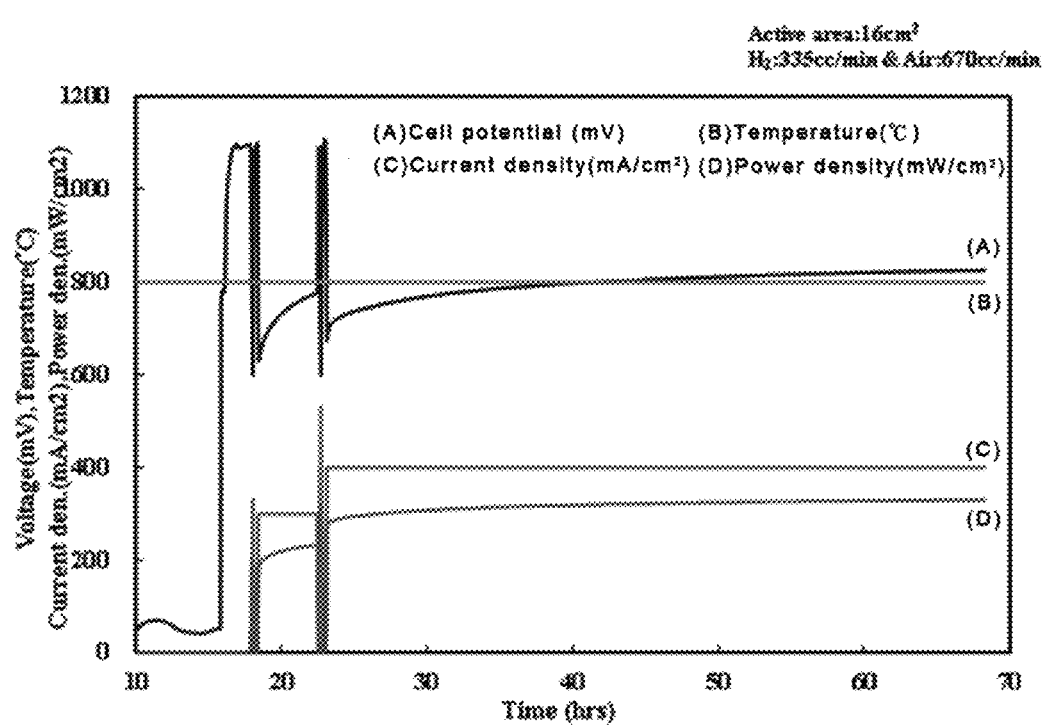
FIG. 6 is a schematic drawing indicates a long duration performance test result for a SOFC with perforation of a pore array anode structure.

Step 5: Onto the electrolyte layer use screen printing process to build porous cathode layer of LSM material. Then conduct sintering at about 1200° C. for 3 hours. The sintering temperature rate can be, but not limited to, 3° C./min or less. This will lead to production of an unit cell of SOFC-MEA, as shown in FIG. 3. The unit cell is subject to power performance testing. The test result is compared with a unit cell produced without the pore array perforation on the anode green tape, as shown in FIG. 4 and FIG. 5. It indicates that open circuit voltage (OCV) has reached the theoretical standard value (>1.1 V), electricity generation efficiency has been raised 25%, and the gas diffusion impedance has been lowered 40%. The FIG. 6 also indicates a long duration electrical performance test result for a SOFC-MEA unit cell having pore array perforation on the anode green tape. The unit cell has increasing voltage rising rate under operation condition of constant electric current 400 mA/cm2, it indicates that the pore array perforation provides effective diffusion path for fuel gas, increasing gas density in the three phase point at interfacial area between anodes and electrolyte, and improving the efficiency of electrochemical reaction.

What is claimed is:

1. A fabrication process for production of a planar type solid oxide fuel cell membrane electrode assembly ("SOFC-MEA") with pore array anode structure, comprising the steps of:

Step 1: producing thin strip anode green tapes by tape casting;

Step 2: providing a pore array structure having a specified diameter for each pore and a specified spacing between adjacent pores on the surface of the anode green tapes, laminating multiple layers of the anode green tapes that include perforated and non-perforated anode green tapes through heat lamination and equalized water pressure lamination process to produce an anode supported substrate of green tapes having thickness between 300 μm and 800 μm;

wherein the pore array perforation is furnished on a plurality of layers of the anode green tapes on the utmost outside of the anode supported substrate, wherein the pore array perforation furnished on the plurality of layers is distributed and interlaced in a complementary manner on different layers of anode green tapes, respectively;

Step 3: conducting sintering on the anode supported substrate of green tapes at temperature about 1250° C. for 4 hours with temperature increment/decrement rate less than 3° C./min to obtain a first stage SOFC anode supported substrate;

Step 4: conducting surface abrasion and polishing for the first stage SOFC anode supported substrate, firstly using a coarse sand paper to perform a surface pre-abrasion and polishing, followed by using a finer sand paper to produce a flat and smooth surface of the first stage SOFC anode supported substrate;

Step 5: building an electrolyte layer of a thickness less than 10 μm by spin coating on the flat and smooth surface of the first stage SOFC anode supported substrate to produce a SOFC half cell, conducting sintering on the SOFC half cell between 1200° C. and 1600° C. for more than 6 hours with temperature increment/decrement rate less than 3° C./min to obtain a first stage ceramic half cell, and using SEM to analyze the microstructure of the first stage ceramic half cell to assure good adhesion between the SOFC anode supported substrate and the electrolyte layer and that the electrolyte layer is open pore free, and, if open pores still exist in the electrolyte layer, fixing the open pores with spin coating or sintering at temperature about 1350° C. for more than 6 hours to make the electrolyte layer open pore free and fully dense; and Step 6: building a porous cathode layer of LSM material onto the electrolyte layer by screen printing, followed by sintering at about 1200° C. for 3 hours with a sintering temperature rate less than 3° C./min to complete the production of a unit cell of SOFC-MEA.

2. The fabrication process of claim 1, wherein the pore array structure is formed in a press and pierce manner using a metal tube with diameter in a range about 0.1 cm to 0.3 cm to fabricate the pore array with the spacing of about 1.4 cm between adjacent pores on one side of the thin strip anode green tapes.

3. The fabrication process of claim 1, wherein the size of the unit cell is in a range from 5×5 cm$^2$ to 10×10 cm$^2$.

4. The fabrication process of claim 1, wherein 2 to 6 layers are laminated in the step of laminating multiple layers of the anode green tapes.

5. The fabrication process of claim 1, wherein the surface abrasion and polishing for the SOFC anode supported substrate is conducted for a depth of about from 10 μm to 20 μm.

* * * * *